United States Patent
Genway-Hayden et al.

(10) Patent No.: US 8,777,761 B2
(45) Date of Patent: Jul. 15, 2014

(54) COMPOSITE TUBESHAFT TO METALLIC INTERFACE

(71) Applicant: GKN Driveline North America, Inc., Auburn Hills, MI (US)

(72) Inventors: Robert Genway-Hayden, Rochester Hills, MI (US); Leonard R Elias, Macomb, MI (US); Craig A Campbell, West Bloomfield, MI (US); Arthur Ball, Oxford, MI (US)

(73) Assignee: GKN Driveline North America, Inc., Auburn Hills, MI (US)

(*) Notice: Subject to any disclaimer, the term of this patent is extended or adjusted under 35 U.S.C. 154(b) by 0 days.

(21) Appl. No.: 14/053,370

(22) Filed: Oct. 14, 2013

(65) Prior Publication Data

US 2014/0051524 A1  Feb. 20, 2014

Related U.S. Application Data

(63) Continuation of application No. PCT/US2011/032663, filed on Apr. 15, 2011.

(51) Int. Cl.
| | |
|---|---|
| *F16C 3/02* | (2006.01) |
| *B29C 65/64* | (2006.01) |
| *B21B 15/00* | (2006.01) |
| *B29C 65/56* | (2006.01) |

(52) U.S. Cl.
CPC . *F16C 3/02* (2013.01); *B29C 65/64* (2013.01); *B21B 15/00* (2013.01); *B29C 65/562* (2013.01); *F16C 3/026* (2013.01); *F16C 2326/06* (2013.01); *Y10S 24/28* (2013.01)
USPC ............... 464/181; 156/187; 24/DIG. 28

(58) Field of Classification Search
USPC ............ 464/181–183; 403/267, 339, 364, 403/DIG. 15; 428/36.9; 52/289, DIG. 6; 24/67.9, 67 AR, 67 P, 545–547, 563, 24/570, DIG. 9, DIG. 22, DIG. 28; 156/171, 156/187, 188
See application file for complete search history.

(56) References Cited

U.S. PATENT DOCUMENTS

| | | | | |
|---|---|---|---|---|
| 1,648,408 | A * | 11/1927 | Kumagai | 24/67.9 |
| 1,744,560 | A * | 1/1930 | Lukacs | 24/67.9 |
| 4,289,557 | A * | 9/1981 | Stanwood et al. | 156/171 |
| 6,464,591 | B1 * | 10/2002 | Nakajima | 464/181 |
| 6,863,763 | B2 * | 3/2005 | Lee et al. | 156/188 |

FOREIGN PATENT DOCUMENTS

| | | |
|---|---|---|
| JP | 09011763 A | 1/1997 |
| JP | 2001032819 A | 2/2001 |
| JP | 2008230031 A | 10/2008 |
| KR | 1020060000716 A | 1/2006 |

* cited by examiner

*Primary Examiner* — Gregory Binda
(74) *Attorney, Agent, or Firm* — Jennifer M. Brumbaugh; Reising Ethington P.C.

(57) ABSTRACT

A composite tubeshaft comprising a composite substrate defined by a first surface and a second surface; and a metallic substrate having at least two teeth. The teeth of the metallic substrate engage the composite substrate such that at least one tooth is positioned over the first surface and at least one tooth is positioned over the second surface.

9 Claims, 8 Drawing Sheets

COMPOSITE TUBESHAFT TO METALLIC INTERFACE

This application is a continuation of PCT application, US/2011/032663, titled COMPOSITE TUBESHAFT METALLIC INTERFACE, and filed on Apr. 15, 2011.

TECHNICAL FIELD

The present disclosure generally relates to drive systems of the type having a composite tubeshaft and more particularly including a metallic substrate joined to a composite substrate to form a composite tubeshaft.

BACKGROUND ART

Conventional driveline systems typically include tubeshaft assemblies for delivering torque from a driving system, such as a motor or engine to a driven system, such as wheels or power equipment. Typically, these shafts have been made from a steel, aluminum or composite material having connection devices such as a constant velocity joint or other joint end mounting attached thereto Composite drive/shafts offer excellent strength-to-weight and stiffness-to-weight ratios compared to metallic driveshafts. Their coefficients of thermal expansion are generally low, which reduces the load on couplings and hanger bearings caused by thermal excursions. These drive shafts play an increasingly important role in today's air and automotive drivetrain industries, which are constantly seeking ways to increase strength while reducing the gross weight of the vehicle. Composite driveshafts have found many applications in the design of drivetrain systems for the reduction of wear and improved strength.

However, composite driveshafts require metallic adapters for interfacing other shaft components to transmit loads. In general, composite tubeshafts are typically made by weaving composite thread around a shaft mandrel, adding resin and curing. The created tube is then machined to create a desired interlock configuration and a joint end is slid into the end of the shaft and is locked into place by a securing collar or wrapping more composite around the joint end and repeating the curing process. Another common method is to wrap the composite thread around a shaft mandrel with the joint end in place or to insert the joint end onto the end of the finished composite shaft and wrapping additional composite material around the joint end to secure it to the composite shaft. Generally, multiple types of composite-adapter joint end systems are employed for composite driveshafts: notched (cutouts at the end of the shaft with corresponding raised features on a joint end), notched with retaining collar, press-fit (either internal or external), lugged (joint end includes lugs surrounded by composite then cured in place), bonded joints (joint end is placed in tube and additional composite is wrapped around to create a bond after curing) and bonded joints with ribs (joint end is placed in tube prior to curing). These designs are limited by their structural integrity, weight, or manufacturing costs and complexity.

Therefore, what is needed is an integrally fabricated encapsulated connection for a tubeshaft metallic interface end and a method for providing same that is low cost, lightweight and high strength.

BRIEF DESCRIPTION OF DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

DETAILED DESCRIPTION

Exemplary illustrations are described below. In the interest of clarity, not all features of an actual implementation are described in this specification. It will of course be appreciated that in the development of any such actual illustration, numerous implementation-specific decisions must be made to achieve the developers' specific goals, such as compliance with system-related and business-related constraints that will vary from one implementation to another. Moreover, it will be appreciated that such a development effort might be complex and time-consuming, but would nevertheless be a routine undertaking for those of ordinary skill in the art having the benefit of this disclosure.

Figure 1:
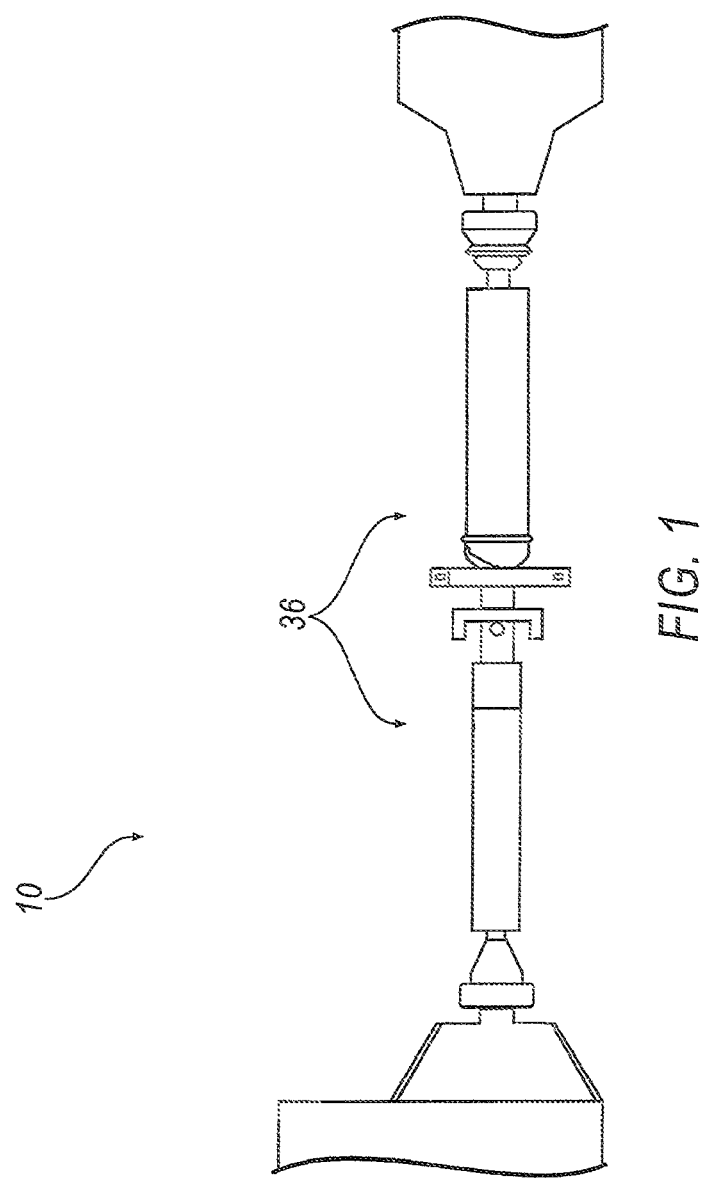
FIG. 1 illustrates a top view of an exemplary driveline system.

Referring to the drawings, FIG. 1 illustrates an exemplary driveline 10 of a vehicle (not shown). Generally, a propeller shaft is a tubeshaft 36. The tubeshaft 36 transmits torque from a drive member (not shown) to a differential (not shown) through a torque transmitting element. However, a composite tubeshaft 36 may be used for any known torque transmitting shaft, for example, half shafts or driving member for transmitting rotational forces to a wheel.

Figure 2:
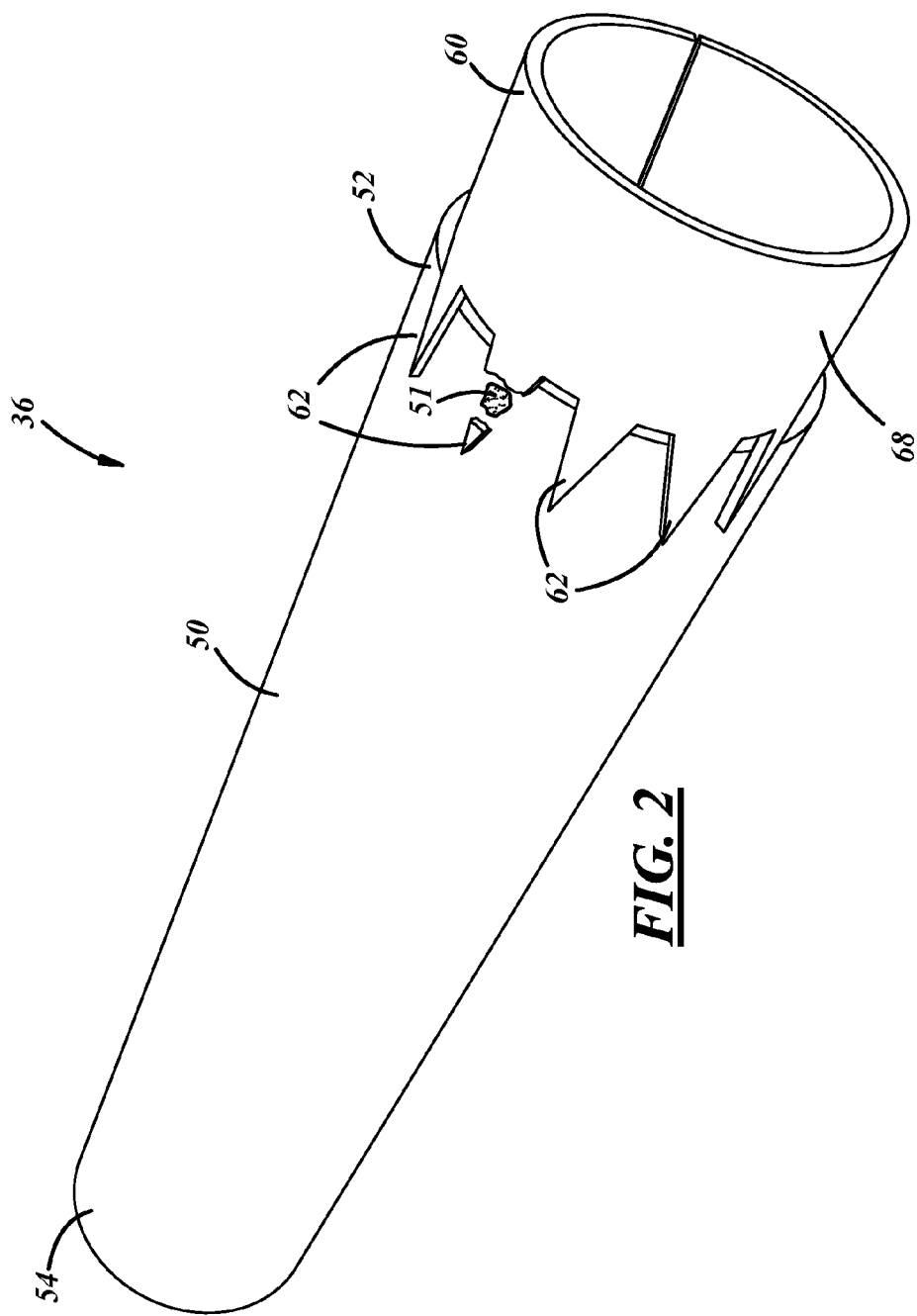
FIG. 2 illustrates an isometric view of a composite substrate and metallic substrate post rolling creating a tubeshaft with an integrated metallic end.

FIG. 2 illustrates an exemplary tubeshaft 36. The tubeshaft 36 is comprised of a composite sheet substrate 50, a securing agent 51 and a metallic substrate 60. A section of the metallic substrate 60 is depicted broken away in FIG. 2 in order to show the securing agent 51.

Figure 3:
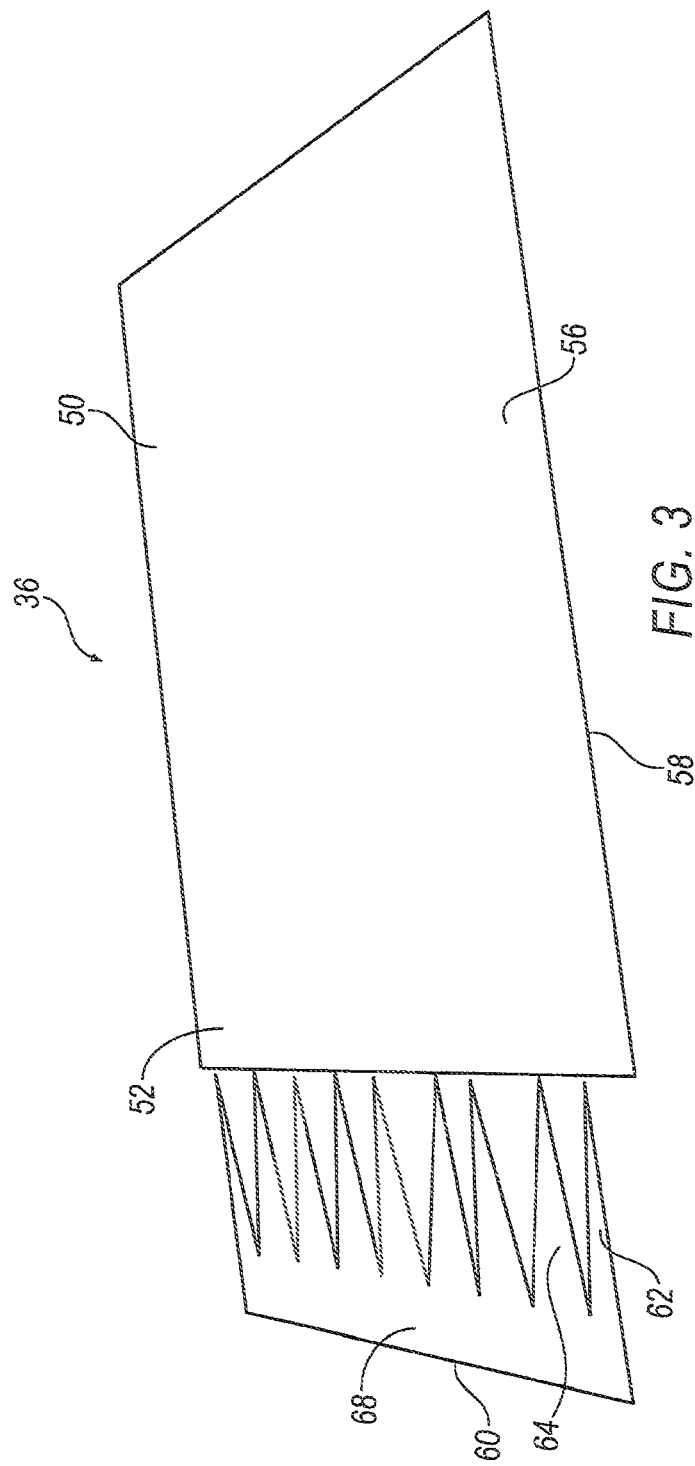
FIG. 3 illustrates an isometric view of a composite substrate and metallic substrate prior to first end engagement.

FIG. 3 illustrates a raw pre-rolled and pre-engaged tubeshaft 36 assembly comprising a generally planar serrated metallic substrate 60 and a generally planar composite substrate 50. The generally planar serrated metallic substrate 60 includes at least two serrated teeth 62 and 64 and a torque transmitting element attaching region 68. The metallic substrate 60 may be made from steel, iron or other materials. The attaching region 68 of the metallic substrate 60 may be connected, by any known attachment method (such as threading, adhering, welding or fusing) to a torque transmitting element, such as, a yoke (not shown) or a constant velocity joint (not shown) at the torque transmitting element attaching region 68.

The serrated teeth 62 and 64, engage the composite substrate 50. This engagement creates a locking interface between the teeth 62, 64 and the composite substrate 50 by applying simultaneous compressive forces (not shown) to both a first surface 56 and a second surface 58 of the composite substrate 50. These forces (not shown) are the result of the composite substrate 50 being weaved between each tooth 62 and 64 creating tension between the alternating teeth 62, 64. The engagement of the composite substrate 50 and the metallic substrate 60 may be of any known type such as, meshing or weaving, as long as the engagement creates a locking interface between the two substrates 50, 60. While shown as having a generally triangular shape, it is understood that teeth 62 and 64 may be configured with other shapes.

The generally planar composite substrate 50, of FIG. 3, may be of any polymer composite matrix material, such as carbon/epoxy, glass/epoxy, carbon/glass/epoxy or graphite. The generally planar composite substrate 50 may be a woven, laminated or other form of load bearing composite material known to those skilled in the art of composite materials. The composite matrix material is generally pliable during assembly and prior to the curing process. This pliability allows for a consistent meshing between the composite substrate 50 and the serrated teeth 62, 64 prior to the hardening of the securing agent 51. Once the securing agent 51 is applied and the tubeshaft 36 is assembled, the assembly is then rolled and hardened to create tubeshaft 36. Hardening is the result of curing the epoxy resin, thus providing rigidity to and bonding the composite matrix material. The curing process may be through the application of heat or by allowing the assembly to sit in a controlled environment for a controlled time. Once polymerization has occurred the tubeshaft 36 composite substrate 50 is completely bonded to itself, as well as to the metallic substrate 60 and is, therefore, ready for use in a driveline 10.

Figure 4:
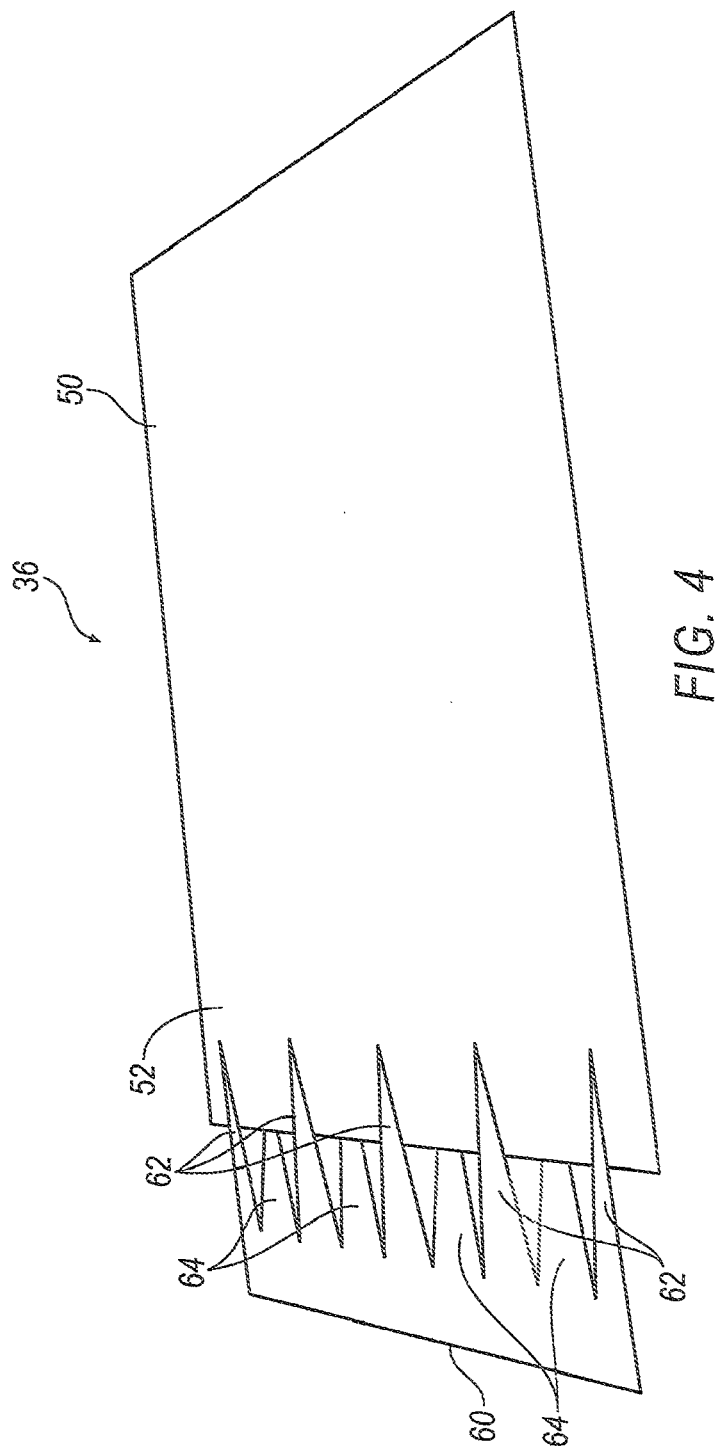
FIG. 4 illustrates an isometric view of a composite substrate and metallic substrate during first end engagement.

FIG. 4 illustrates a partially engaged tubeshaft 36 assembly comprising the generally planar serrated metallic substrate 60 with the serrated teeth 62 and 64 partially engaged with the generally planar composite substrate 50. The engagement is occurring at a first end 52.

Figure 5:
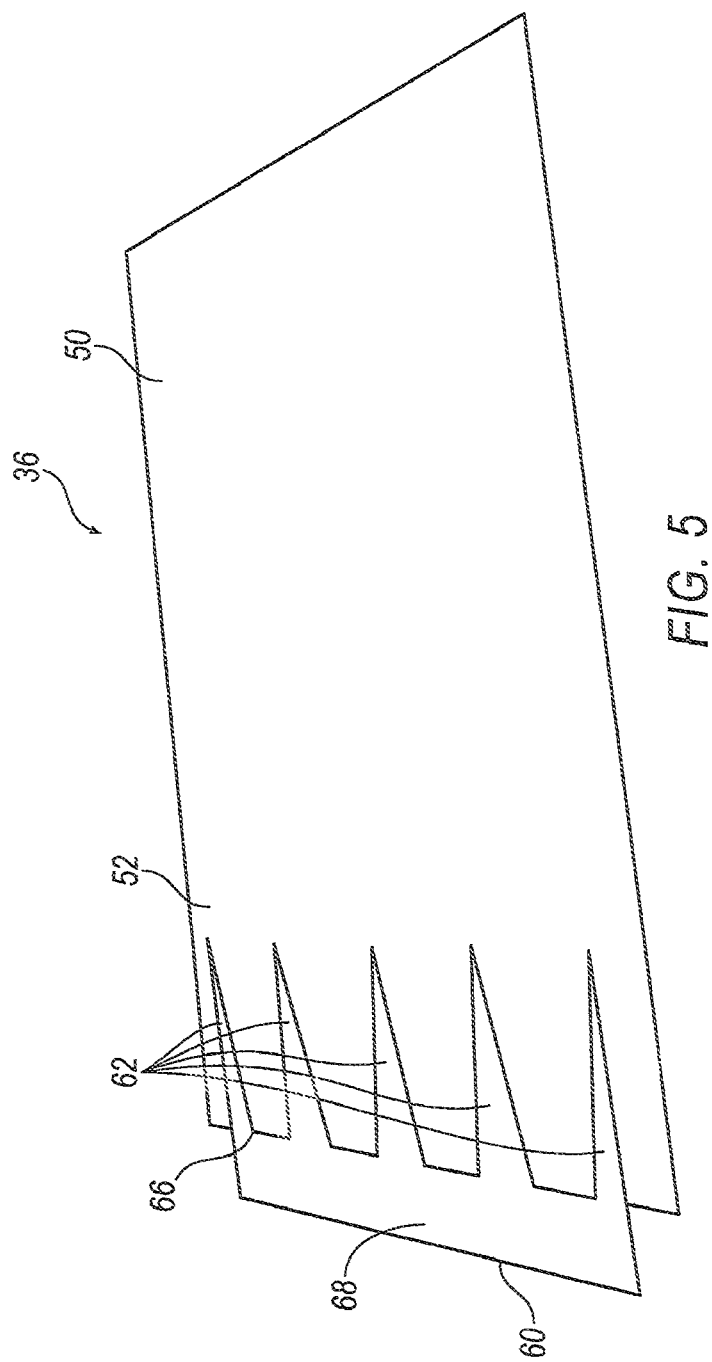
FIG. 5 illustrates an isometric view of a composite substrate and metallic substrate fully engaged at a first end.

FIG. 5 illustrates a fully engaged tubeshaft 36 assembly comprising the generally planar serrated metallic substrate 60 with the serrated teeth 62 fully engaged with the generally planar composite substrate 50 meshed to a base 66 of the torque transmitting attaching region 68. The illustration demonstrates how the composite substrate 50 is threaded with the metallic substrates 60 as serrated teeth 62 are spaced on the first surface 56 of the composite substrate 50 and the serrated teeth 64 (not shown in FIG. 5) are on the second surface 58 of the composite substrate 50. While shown as being equally spaced, it is understood that teeth 62 and 64 may be configured with any distance between each desired serrated tooth shape.

Figure 6:
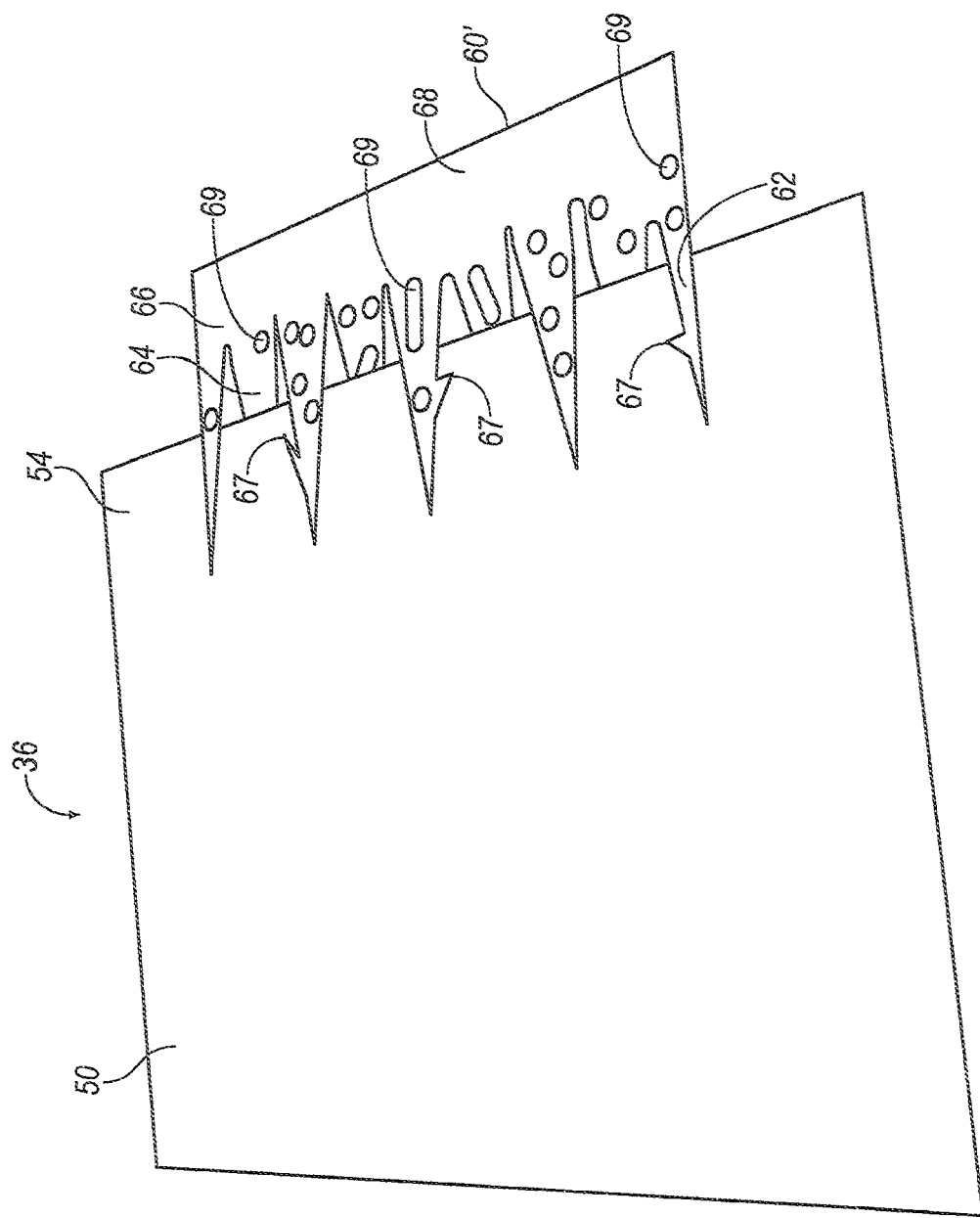
FIG. 6 illustrates an isometric view of a composite substrate and barbed metallic substrate during second end engagement.

FIG. 6 illustrates a partially engaged tubeshaft 36 assembly comprising the generally planar composite substrate 50 partially meshed with a generally planar serrated metallic substrate 60' with apertures 69 and barbs 67 integrally formed into and on the serrated teeth 62, 64. The metallic substrate 60' is partially engaged with the composite substrate 50 and positioned at a second end 54. The barbs 67 may be of any dimension or angle to allow for locking engagement with multiple layers of the composite substrate 50 when the composite substrate 50 and the metallic substrate 60 are rolled to form the tubeshaft 36. Further, the apertures 69 may also be of any size or dimension to allow the composite substrate 50 to penetrate the apertures and bond to the rolled layers during assembly and curing of the tubeshaft 36.

Figure 7:
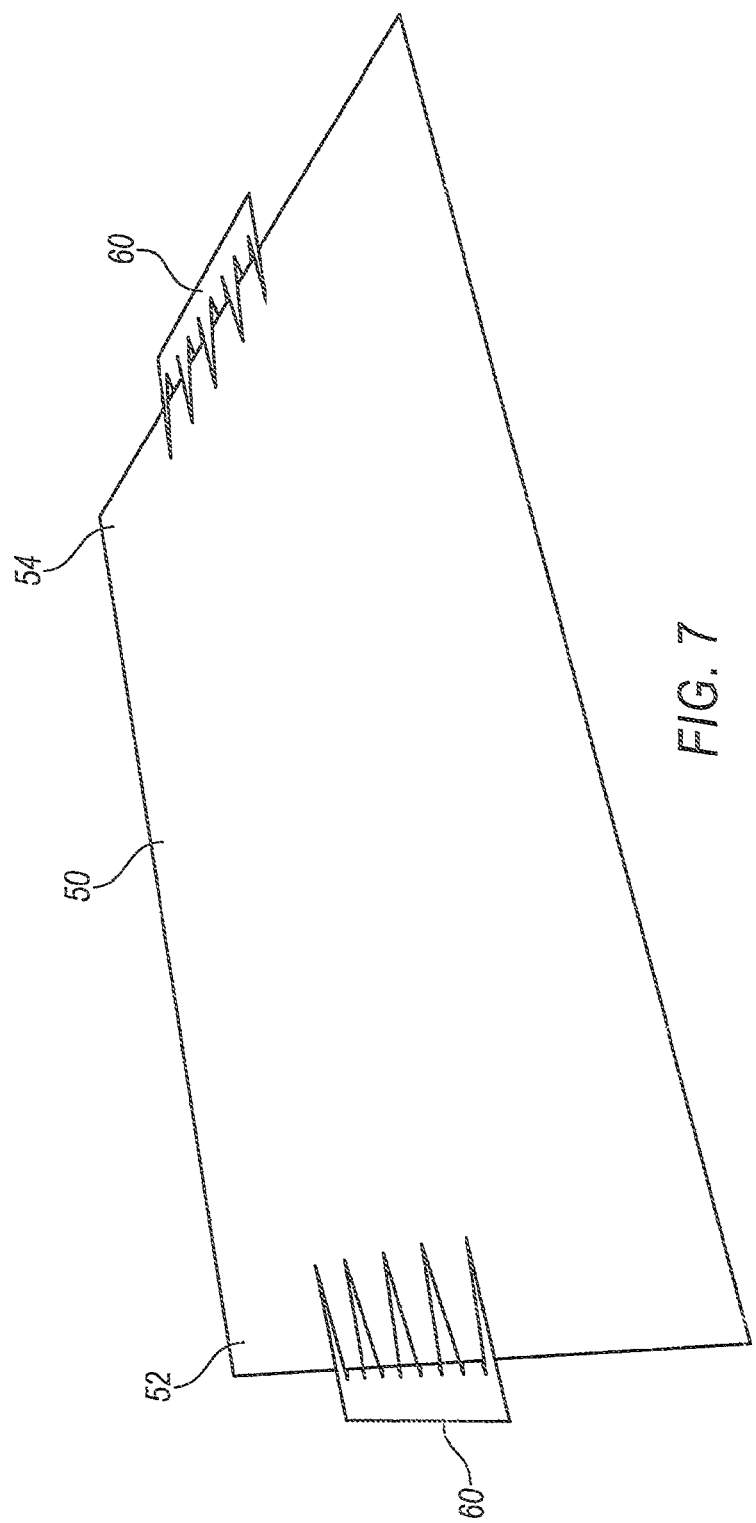
FIG. 7 illustrates an isometric view of a composite substrate and two metallic substrates engaged at first and second ends of the composite substrate.

FIG. 7 illustrates a fully engaged tubeshaft 36 assembly comprising the generally planar composite substrate 50 fully meshed with a generally planar serrated metallic substrate 60 at the first end 52 and the second and 54.

It should be known that the composite substrate 50 and the metallic substrate 60 may be of any suitable dimension capable of being rolled to create the desired length, thickness and diameter of the finished tubeshaft 36 assembly. The composite material may also be of a desirable thickness to provide the required strength of materials properties for each application.

Figures 8, 9:
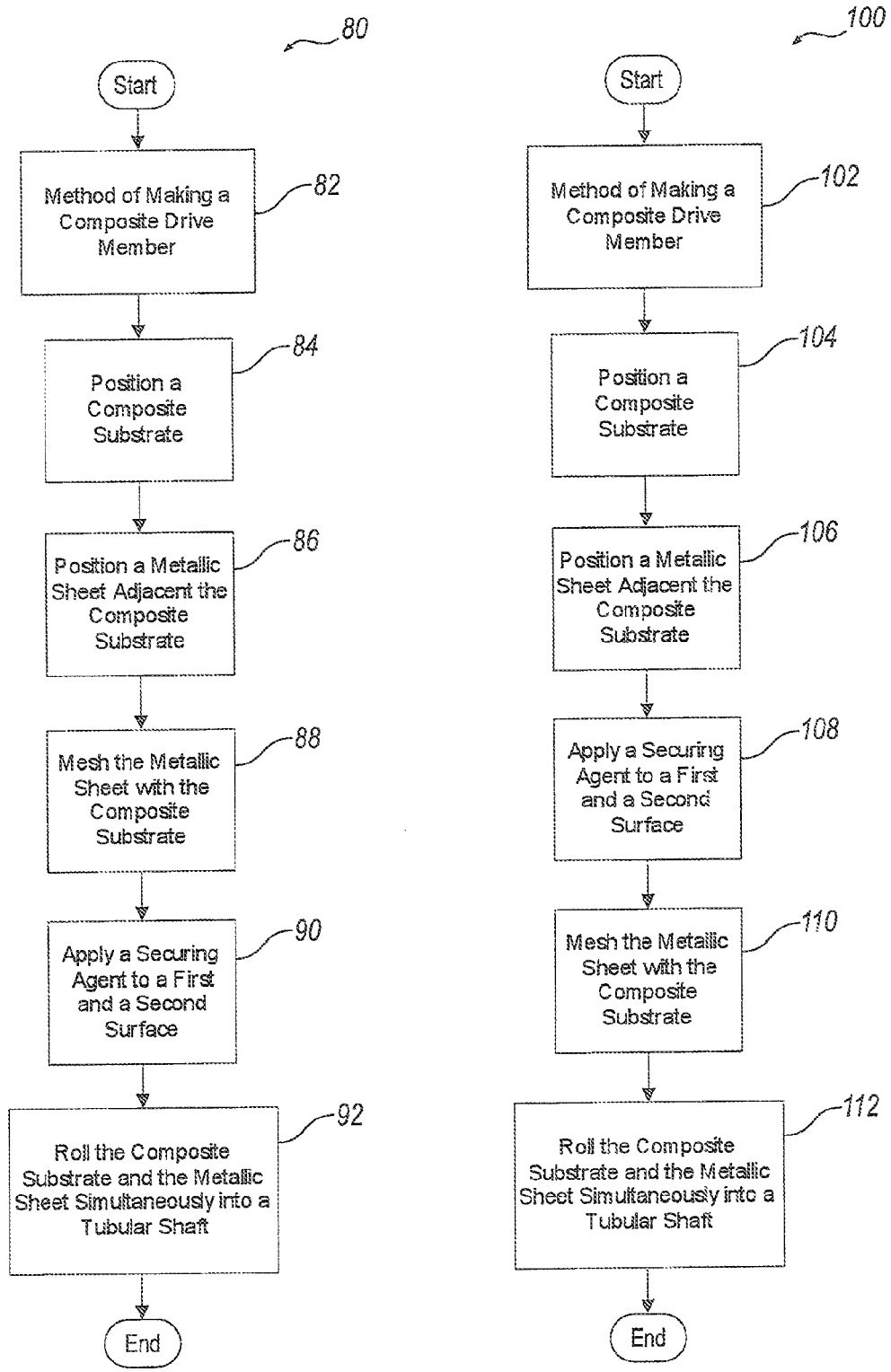
FIG. 8 illustrates the steps of a method of manufacturing a composite tubeshaft assembly.
FIG. 9 illustrates the steps of an alternative method of manufacturing a composite tubeshaft assembly.

As shown in FIGS. 8-9, the method of making a composite tubeshaft 36 assembly comprises positioning a composite sheet substrate 50 so as to be generally planar relative to a plane; positioning a metallic substrate 60, having teeth 62, 64, so as to be generally planar relative to a plane and adjacent at least one end 52, 54 of the composite substrate 50; sliding and meshing the metallic substrate 60 to engage at least one serrated tooth 62 on the first surface 56 of the composite substrate 50 and at least one serrated tooth 64 on the second surface 58 of the composite substrate 50; applying the securing agent 51 to saturate the first surface 56 and the second surface 58 of the composite substrate at the one end 52,54 where the metallic substrate 60 is positioned; rolling the composite substrate 50 and metallic substrate 60 to create a laminated tubeshaft 36 assembly. Once the tubeshaft 36 assembly is created, a curing or polymerization process begins and the rolled substrates 50, 60 of the tubeshaft 36 assembly are bonded together to create an integral tubeshaft 36 assembly.

The application of the securing agent 51 can be applied before or after the engagement of the metallic substrate 60, but prior to rolling the assembly to create the tubeshaft 36. Further, the serrated teeth 62, 64 can be alternated provided at least one tooth 62, 64 is positioned on top of the composite substrate 50 and at least one tooth 62, 64 is positioned beneath the composite substrate 50.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

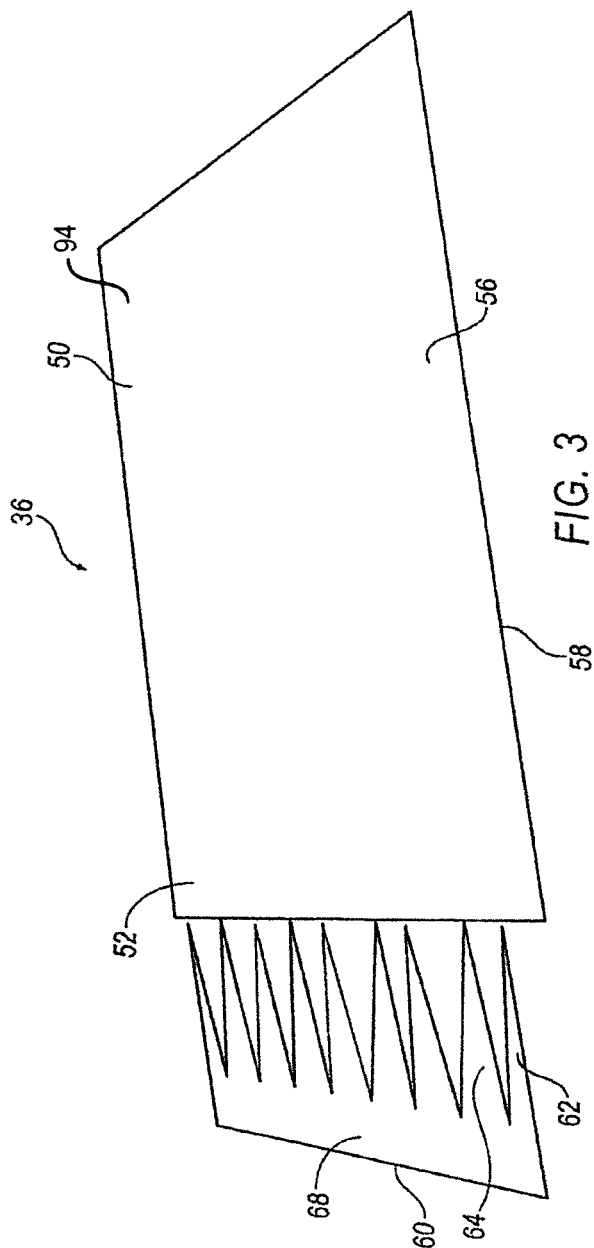

What is claimed is:

1. A vehicle composite tubeshaft assembly comprising:
   a composite substrate defined by a first surface and a second surface; and
   a metallic substrate having at least two teeth, wherein the teeth engage the composite substrate and at least one tooth of the at least two teeth is positioned over the first surface while at least one tooth of the at least two teeth is positioned over the second surface to engage the metallic substrate to the composite substrate, wherein the composite substrate and the metallic substrate are rolled to create the vehicle composite tubeshaft assembly.

2. The vehicle composite tubeshaft assembly of claim 1 further including a securing agent to bond the metallic substrate to the composite substrate.

3. The vehicle composite tubeshaft assembly of claim 1 wherein the metallic substrate includes a region that attaches the composite tubeshaft to a torque transmitting element.

4. The vehicle composite tubeshaft assembly of claim 3 wherein the region includes a base such that the at least two teeth extend from the base and are positioned over the first and second surfaces of the composite substrate.

5. The vehicle composite tubeshaft assembly of claim 1 wherein the teeth of the metallic substrate are serrated.

6. The vehicle composite tubeshaft assembly of claim 1 wherein the metallic substrate includes apertures.

7. The vehicle composite tubeshaft assembly of claim 1 wherein the metallic substrate includes barbs.

8. The vehicle composite tubeshaft assembly of claim 1 wherein the teeth are equally spaced equidistant from each other.

9. A method of producing a vehicle composite tubeshaft assembly comprising:
positioning a planar composite substrate;
positioning a metallic substrate having at least two teeth that are generally planar relative to the composite substrate;
positioning one of the at least two teeth of the metallic substrate on a first surface of the composite substrate and another one of the at least two teeth of the metallic substrate on a second surface of the composite substrate such that an end of the composite substrate is attached to a base of the metallic substrate;
applying a securing agent to the at least two teeth of the metallic substrate and the composite substrate;
rolling the composite and the metallic substrates to form a tubeshaft; and
curing the tubeshaft.

* * * * *

UNITED STATES PATENT AND TRADEMARK OFFICE
CERTIFICATE OF CORRECTION

PATENT NO. : 8,777,761 B2  
APPLICATION NO. : 14/053370  
DATED : July 15, 2014  
INVENTOR(S) : Genway-Haden et al.

It is certified that error appears in the above-identified patent and that said Letters Patent is hereby corrected as shown below:

On the title page item [72], delete "Robert Genway-Hayden" and insert --Robert Genway-Haden--

In the Drawings

Delete Fig. 3 and insert Fig. 3 as shown on the attached page

Signed and Sealed this
Fifteenth Day of September, 2015

Michelle K. Lee
*Director of the United States Patent and Trademark Office*